Oct. 22, 1946.  E. H. BIRDSALL  2,409,657
APPARATUS FOR FEEDING AND DELIVERING AMMUNITION BLANKS
Filed Nov. 4, 1942

INVENTOR.
Edwin H. Birdsall
BY Harold L. Gammons
AGENT

UNITED STATES PATENT OFFICE 2,409,657

APPARATUS FOR FEEDING AND DELIVERING AMMUNITION BLANKS

Edwin H. Birdsall, Golden, Colo., assignor to Remington Arms Company, Inc., Bridgeport, Conn., a corporation of Delaware Application November 4, 1942, Serial No. 464,511

2 Claims. (Cl. 209—72)

This invention relates to new and improved hopper mechanism having particular reference to the type of hopper having members therein for separately taking articles or blanks out of a common mass and delivering them successively to a discharge point.

It is an object of this invention to provide improved means for transferring the articles or blanks from the article delivering members to the discharge point. A further object is to provide a chute for the blanks which will obviate stacking in any manner or at any point. A further object is to transfer the blanks from the delivering members to the discharge point by means of a curvilinear surface adapted to reverse the direction of flight of the blanks and to deflect the blanks from the vertical plane of the delivery members into the vertical plane of a discharge tube. A still further object is to provide a chute adapted to cause displacement of any surplus articles either to the right or left of the chute when the latter is filled.

The above specified objects are representative of the most outstanding functions of the invention as hereinafter described, but it will be understood that there are other less obvious features and advantages which should not be overlooked. For example, as made evident by the following description, the surface of the chute is such that surplus articles falling therefrom will be caromed away from the article carrying element so as to obviate the possibility of surplus articles falling down into the lower part of the hopper, for, in such case, these articles might be wedged against other surplus articles, or imperfect articles still clinging to the carrying element and thus become damaged or effect malfunctions. Further, the surface of the chute is so arranged that the surfaces of any cases, momentarily lying in the chute, will present sloping surfaces to any additional cases so that the latter will be caromed out of the plane of the article carrying means.

In the manufacture of tubular articles, and, more especially, ammunition components, such as cartridge cases, the latter are formed from suitable sheet metal by blanking and drawing operations. Following the final draw, the tubular blanks, closed at one end, are trimmed and headed and thereafter transferred to an automatic head turning machine which is adapted to turn the head to finished dimensions and form the extraction groove. These head turning machines and, in fact, many other types of ammunition component processing machines are supplied with blanks from an automatic hopper, one of the most common of which comprises a bin for holding a mass of blanks and a rotating member having pins or other equivalent means adapted to be moved through the mass of blanks. The pins pick up the blanks and carry them around to a suitable guide means which feeds the blanks to transferring means comprising, in part, a discharge tube adapted to convey the blanks to the particular machine performing the next operation.

The present type of discharge tube has an opening in its squared upper end substantially in the vertical plane of the feed track. It has been found, however, that this construction predisposes to stacking and other malfunctions, that is to say whenever the discharge tube becomes filled with articles, the surplus articles tend to pile up one upon the other so as to intercept the path of the rotating pins and thereby produce jammed articles and broken or bent pins. This tendency of the blanks to stack seems to be particularly characteristic of those blanks which have been headed and which are ready to be fed to the head turning machine, a characteristic which is doubtless due, in part, to the substantially button shaped heads and circumferential fins on these blanks. The word "stacking" as defined above shall be used hereinafter to mean the piling up of one or more surplus blanks on the topmost blank of a completely filled discharge tube.

The present invention relates to improved means for transferring blanks from rotary blank carrying elements to a discharge tube in such a way as to obviate any likelihood of stacking or other malfunctions.

Figure 1:
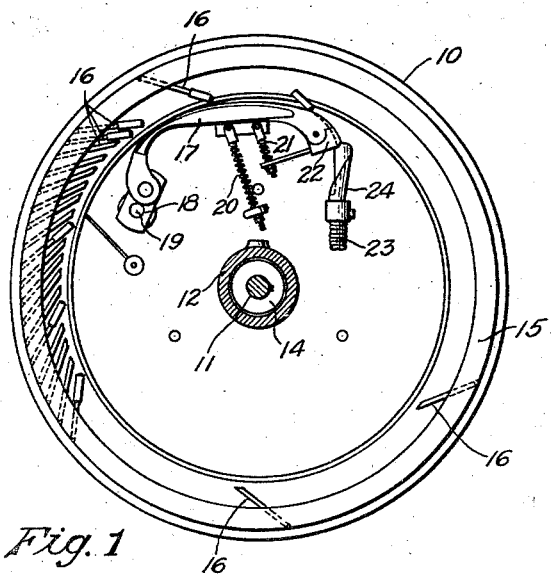
Fig. 1 is a schematic side elevation of an automatic feed hopper showing the improved chute of this invention.

Referring to the drawing, Fig. 1 shows an automatic hopper comprising a rotary member 10, hereinafter termed a drum, secured to a shaft 11 rotatably supported in a journal 12 of a fixed part or hopper body 13, see Fig. 2, and held against endwise movement therein by a collar 14. Suitable driving means, such as a ring gear and pinion (not shown) are adapted to impart continuous rotation to the drum.

Fixed to the inner wall of the periphery of the drum 10 is a ring 15 having a plurality of equispaced article carrying elements such as pins 16 fixed thereto and projecting toward the center of the drum.

Suitably secured within the upper portion of the drum adjacent the ends of the pins 16 is a feed track 17 which, for the purpose of this specification, is shown pivotally secured at one end by a shackle 18 to a post 19 fixedly mounted in the hopper body. The opposite end of the track 17 is resiliently supported by an adjustable coil spring 20, a second coil spring 21 being provided for restraining the displacement of a grooved lip 22 pivoted on the end of the track 17. The latter is thus fixedly supported within but independently of the rotatable drum 10.

Thus, as the member 10 rotates, articles in the lower part of the drum are picked up on the pins 16 and carried into the upper part of the drum whereupon the articles slide down to the lower ends of the pins into engagement with the feed track 17. The articles are then moved forward over the track until they reach the end thereof after which they drop down over the lip 22 free of the pins 16 into suitable transfer means hereinafter described.

The description so far has been on a conventional type of automatic pinwheel hopper embodying mechanisms all of which are well known. It will be understood, however, that the particular pinwheel hopper described herein has been chosen only for the sake of facilitating an understanding of the present invention and that any other suitable type of hopper may be used.

Figure 2:
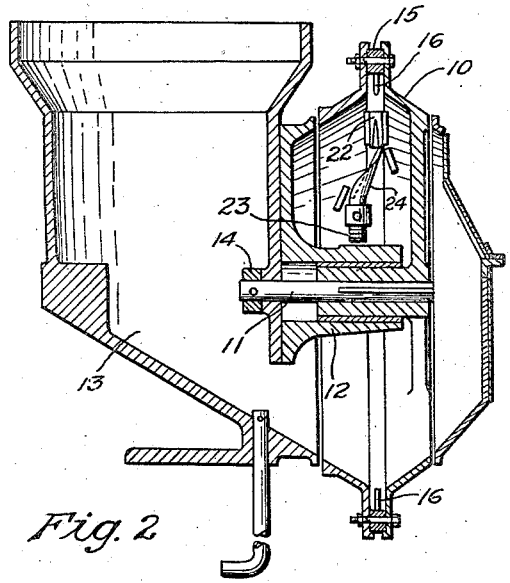
Fig. 2 is a schematic end elevation of the automatic feed hopper of Fig. 1.

The article transferring means of this invention comprises in part a discharge tube 23 which, as shown in Fig. 2, is laterally offset with respect to the vertical plane of the feed track; and an article deflecting means which is interposed between the lip 22 of the feed track and the upper end of the discharge tube 23.

The means for deflecting articles from the lip 22 into the laterally offset discharge tube comprises an active surface indicated generally at 24 and hereinafter referred to as a chute, having the configuration shown in Figs. 3, 4 and 5.

Figure 4:
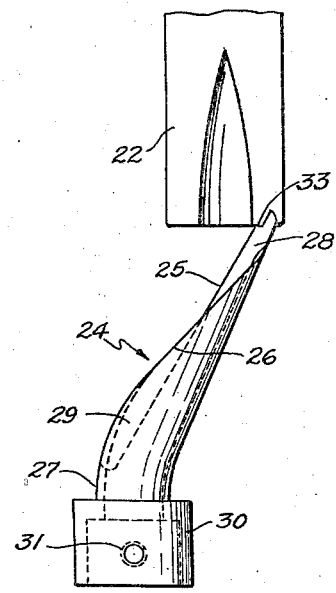
Fig. 4 is an enlarged end elevation of the chute as seen in Fig. 2.
Figure 5:
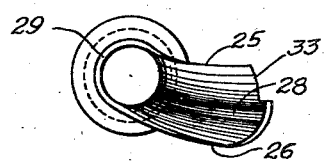
Fig. 5 is a plan view of the chute.

The contours of the active surface of the chute are substantially those of a cylindrical tubular article which has had a portion of its wall cut out so as to have one substantially straight edge 25 and a substantially spiral shaped edge 26, the latter beginning at the top of the straight side 25 and terminating at a closed cylindrical portion 27 adjacent its lower end; the exposed curvilinear surface then being bent backwardly, see Fig. 4, so that the straight side 25 makes an angle of substantially 30 degrees with a vertical axis through the cylindrical portion 27.

The active surface of the chute thus comprises a relatively open shallow concave surface 28 adjacent its upper end, the radius of curvature of which gradually decreases with the increased tightness of the spiralled edge 26 until a substantially complete convolution 29 is made adjacent the lower end of the chute and which leads into the closed cylindrical portion 27. Moreover, this curvilinear surface, which is hereinafter designated as a warped, convolute or spiral surface, is tilted or bent as described above and as illustrated in Fig. 4. Consequently, substantially all contours of the surface are at angles to both the vertical and horizontal planes so that the active surface of the chute will not give stable support to any article which comes to rest therein, but will merely provide transitory support for those articles which are permitted to slide unimpededly from the feed track down into the open end of the discharge tube. The flight of those articles, which are transferred from the lip 22 of the feed track into the open end of the discharge tube, will follow a substantially spiral path which not only reverses the direction of travel of the article but also deflects the article laterally from the vertical plane of the feed track into the vertical plane of the discharge tube.

Suitable means for connecting the chute to the discharge tube 23 comprises an apertured flanged cap 30 secured by a weld joint or other suitable fastening means to the lower end of the chute and provided with a set screw 31 for locking the cap to the upper end of the discharge tube.

Figure 3:
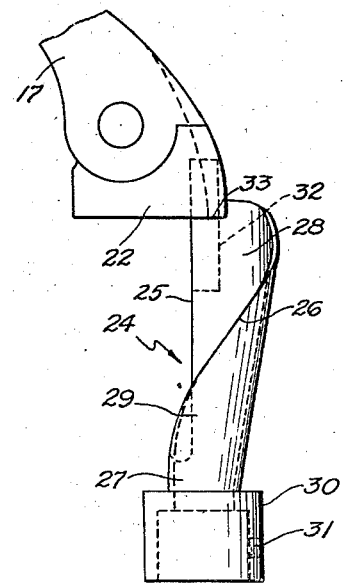
Fig. 3 is an enlarged side elevation of the chute as seen in Fig. 1.

Suitable means for securing the chute to the lip 22 of the feed track comprises a bracket 32, as shown in Fig. 3, welded or otherwise secured to the back side of the chute adjacent its upper end and to the side of the lip 22. A notch 33 is provided in the upper end of the chute and is adapted to engage the side of the lip 22 for facilitating the assembly of the parts, and, moreover, suffices to displace the straight side 25 of the chute slightly to the rear of the front edge of the lip, as seen in Fig. 3. In this way, the distance between the front edge of the lip and the spiralled edge 26 of the surface 28 is such as to preclude any doubling up of articles at this portion of the chute. Further, the effective length of the chute is such that the distance between the lower end of the lip 22 and the open end of the discharge tube is great enough to prevent articles from bridging this distance in a stable condition.

In use, the articles or cartridge case blanks are fed to the track 17 and drop off of the lip 22, as above described, whereupon they strike the shallow concave surface 28 of the chute and are deflected thereby laterally and downwardly in a substantially reverse twist or spiral path into the upper open end of the discharge tube 23. The transfer of the blanks will continue in this manner substantially uniformly, precluding the occurrence of a grossly defective blank, until the discharge tube is completely filled.

Thereafter, as a blank, in excess of the number of blanks required to fill the discharge tube and hereinafter termed a surplus blank, slides down the chute, its entrance into the discharge tube is prevented by the presence of a blank in the upper end thereof, that is to say the surplus blank is momentarily halted in the chute when it strikes the top blank in the discharge tube. However, since the active surface of the chute is tilted and warped in substantially the manner described above, it offers no stable support for the substantially stationary surplus blank, and, consequently, the latter drops off the chute or is displaced therefrom by the next blank delivered over the lip 22. It will be apparent that, due to the configuration of the chute, no interlocking stacking or jamming of blanks can take place. Moreover, the disposition of the chute with respect to the end of the lip 22 and the upper end of the discharge tube is such that surplus blanks are unable to bridge this distance in stable condition or to double up in the chute.

It will be evident, therefore, that substantially no surfaces are presented to the surplus blanks on which they might rest in stable condition, and hence the possibility of surplus blanks stacking and thereby jamming so as to destroy other blanks or elements of the machine is substantially obviated.

Although the description of the invention as given above relates particularly to hopper mechanism of the type used extensively in the manufacture of ammunition components, it will be understood that the embodiment shown is for the purpose of illustration only and that the invention is not limited thereby but includes all modifications within the scope of the appended claims.

What is claimed is:

1. In a hopper mechanism, the combination with a rotary member having blank carrying elements arranged to engage said articles in a single position of longitudinal orientation; a track; a discharge tube having an open upper end displaced laterally with respect to said track, said track being adapted to support blanks before being released from said carrier elements; and a chute connecting one end of said feed track and said discharge tube, the open upper end of said chute comprising a continuous spiral surface adapted to impart a twisting movement to said blanks while being fed from said feed track into said discharge tube.

2. Means to transfer elongated articles from a random mass in a hopper to a delivery tube in end-to-end relationship comprising a rotary member having elements arranged to engage said articles in a single position of longitudinal orientation; a track to receive and support articles during their displacement from said elements in the rotation of said rotary member, the mouth of said delivery tube being offset laterally from the vertical plane of said elements and said track; and a spout comprising a continuous spiral article supporting and guiding surface arranged to impart a twisting motion to said articles so as to direct articles as dropped from said track downwardly and laterally into longitudinal alignment with said delivery tube and to enable the free escape of any article which in its movement upon the spiral surface of said spout engages an article held in the upper end of said delivery tube.

EDWIN H. BIRDSALL.